W. A. YERZLEY.
GANG WORK HOLDER.
APPLICATION FILED MAY 28, 1913.
1,102,314.
Patented July 7, 1914.
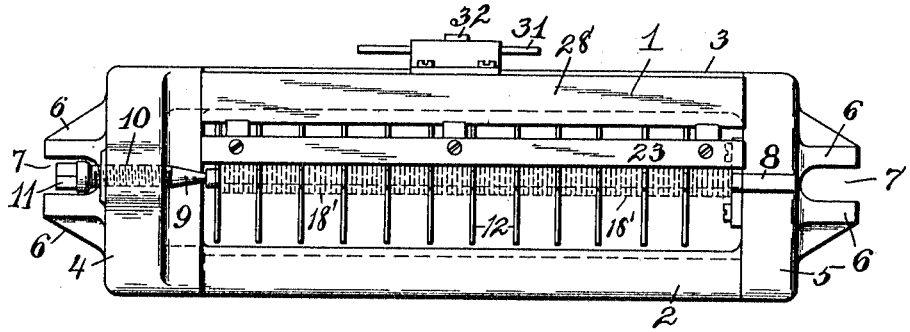
Fig. 1
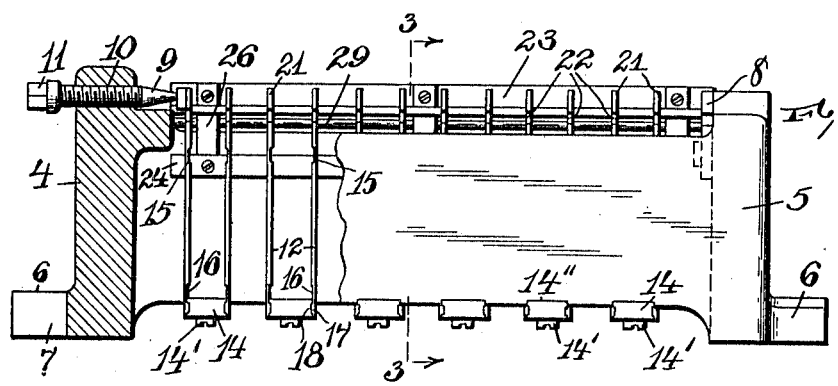
Fig. 2
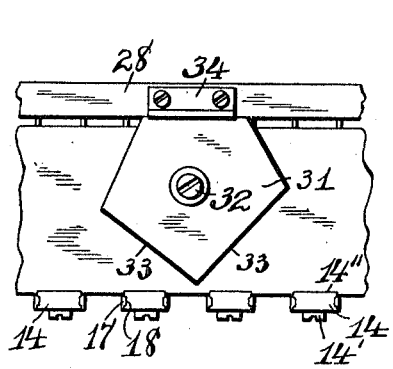
Fig. 4
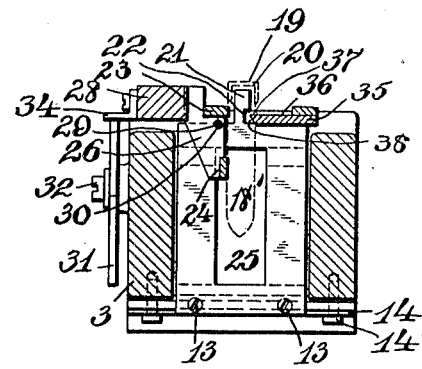
Fig. 3
Fig. 5
WITNESSES:
M. A. Johnson.
L. M. Funke.
INVENTOR
William A. Yerzley
BY Dyke & Canfield
ATTORNEYS
THE NORRIS PETERS CO., PHOTO-LITHO., WASHINGTON, D. C.

UNITED STATES PATENT OFFICE.

WILLIAM A. YERZLEY, OF NEWARK, NEW JERSEY, ASSIGNOR, BY MESNE ASSIGNMENTS, TO NAGLE RE BLADE KNIFE COMPANY, INC., OF SCHENECTADY, NEW YORK, A CORPORATION OF NEW YORK.

GANG WORK-HOLDER.

1,102,314.      Specification of Letters Patent.      Patented July 7, 1914.

Application filed May 28, 1913. Serial No. 770,322.

*To all whom it may concern:*

Be it known that I, WILLIAM A. YERZLEY, a citizen of the United States, and a resident of Newark, county of Essex, and State of New Jersey, have invented certain new and useful Improvements in Gang Work-Holders, of which the following is a specification.

My invention concerns the holding of a number of parts rigidly in place in line with one another while being subjected to shaping, finishing or like operations, and so that the entire number of parts so held may be operated upon at one time, and when shaped or finished the shaped or finished portions of the separate parts will be identical or substantially so.

One of the uses which may be made of my invention is for the holding in place of knife blades to the number of several dozen while the tangs thereof are being milled or ground or otherwise formed to shape at their ends and adjacent side edges, and it is for this particular use that the embodiment of my invention shown herein is especially designed. My invention, however, is not limited to the holding of knife blades, but may be made use of when parts of any kind are to be shaped or finished or subjected to similar operations in quantities, the construction shown being for the purpose of illustration only, and it being possible to make numerous changes therein within the scope of my claims without departing from my invention or sacrificing any of its advantages.

In the accompanying drawings, forming a part of this specification, and wherein the same reference numerals are applied to designate the same parts throughout, Figure 1 is a top view of a form of fixture for holding a number of knife blades in place and constructed in accordance with my invention; Fig. 2 is a side view of the device shown in Fig. 1, a portion thereof being shown in central longitudinal cross-section; Fig. 3 is a transverse cross-sectional view taken on the line 3—3, Fig. 2; Fig. 4 is a fragmentary rear view of the device and showing an adjusting means, and Fig. 5 is a fragmentary, detail edge view of the spring spacing plates with knife blades held between them.

Reference numeral 1 indicates generally a fixture in accordance with my invention for holding parts in place in large numbers during milling, grinding, finishing, machining or other operations to which the same are subjected. In the form shown, it comprises substantially parallel side members 2 and 3, connected at their ends by cross heads 4 and 5. Means of connection such as the end lugs 6, 6, with openings or slots 7, 7, between them, are provided for conveniently securing the fixture in place as upon the reciprocating bed of a milling or grinding machine, or in other relations in which it may be used. Other means for holding such fixture in place when in use may, of course, be made use of. One of the cross heads as 5 supports an abutment as shown at 8 and at the remaining cross head as 4 is provided a pressure applying means coöperating with the abutment 8, the two forming substantially the widely separated jaws of a clamp or vise. Such pressure applying means may conveniently take the form of a screw 9, received within the internally threaded opening 10 in the cross head 4 and provided with any convenient means of rotating the same, such as the squared portion 11 to which a crank, wrench or similar instrument may be applied for turning the screw 9. The pressure applying means such as the screw 9 and the coöperating abutment 8 are separated by nearly the entire length of the fixture 1, and if a sufficient quantity of parts to be operated upon were interposed directly between the abutment 8 and screw 9 and attempted to be held in place by applying pressure by means of the screw, it would be impossible to maintain them in line, particularly when subjected to grinding, milling or other action, causing considerable pressure upon the edges or ends of the parts so held.

In order to make it possible to hold and retain a considerable number of parts which are to be operated upon rigidly in line between the screw 9 and abutment 8, I provide means which are spaced at intervals throughout the length of the fixture 1, and between the abutment 8 and screw 9, which, while free to move or give to a sufficient extent along the line of pressure to permit the parts to be inserted in place and to permit their being brought and held tightly together by the action of the pressure applying means, are nevertheless held against movement in other directions, so that when the parts have been brought into place and pressure is applied to hold them in place, they will be retained rigidly in line, notwithstanding they may be attacked by the milling, grinding or other tool or instrument with considerable vigor, and by the provision of means for this purpose, I am enabled to hold and operate upon an extremely large number of parts at one time. Such means in the apparatus shown take the form of comparatively thin sheet metal plates 12, preferably of steel, secured at their lower margins, as by the screws 13, to bars 14 firmly secured to the side members 2 and 3 as by means of the screws 14', and extending substantially parallel to one another and transversely of the fixture. For securing an especially firm connection between the bars 14 and the side members 2 and 3, the side members may be recessed slightly on their under edges, as shown at 14'', and the bars 14 let into such recessed portions. In the form shown, the bars 14 are so arranged and are of such width that the spring members 12 are spaced at regular intervals along the length of the fixture 1; this, however, while the preferable construction, is not essential, as will be understood.

To provide for greater resilience along the line of pressure and to enable the plates 12 to conform readily to the parts which are held in place when pressure is applied, the plates 12 are provided with one or more regions of reduced thickness which may be produced by forming one or more broad shallow grooves in the plates 12 and extending transversely thereof. Two such grooves are preferably provided in each of the plates 12, the grooves 15 which may be arranged fairly close to the free margins of the plates 12, and the grooves 16 being preferably formed fairly close to the lower margins of the plates 12 leaving only a narrow ridge 17 of substantially the original thickness of the plate 12 at the extreme lower margin thereof, which may be received within recesses 18 formed in the sides of the transverse bars 14 and when the plates 12 are secured to the bars 14 as by means of the screws 13, this arrangement, while permitting the plates 12 to bend freely in the neighborhood of the reduced portions formed by the grooves 16, also serves to impart great strength to the joints between the plates 12 and the bars 14, effectually preventing any movement of the plates 12 in the planes thereof, but permitting them to give along the line of pressure. The especial advantages due to the provision of the two thinner regions in the plates 12 will be explained more fully later.

As already stated, while a fixture in accordance with my invention may be used for holding parts of any kind, the form shown is designed more particularly for holding knife blades, and such a knife blade 18' is shown in outline in dotted lines in Fig. 3, the outer dotted lines 19 at the upper end thereof showing the tang of the blade as originally formed as by means of stamping, and the inner dotted lines 20 showing the outline of such knife blade tang after the operations to which the same may be subjected when held in my improved apparatus have been completed.

The spring members 12 are shaped to accommodate the articles being operated upon, and in the form shown, are provided with substantially central upstanding portions 21, and stacks of knife blades of sufficient overall thickness to occupy the space between adjacent spring plates 12, are interposed between the said plates, but the portions 21 of the plates 12 as shown, do not extend to the outer edge of the knife blade tangs, and, therefore, do not interfere in any manner with the milling or finishing or other operation. These upstanding portions 21 are also preferably provided with notches 22 which are placed at the junction of the upstanding portions 21 with the body of the plate 12 and correspond to the notches in the knife blade between the tang and the thinner forged blade portion.

I preferably provide means for alining the parts to be operated upon, such part in the form shown being the knife blade 18'. Such alining means may consist of a single plate as 23 extending along the tops of the plates 12, preferably, however, an additional alining means such as the bar 24 is provided at a distance below the bar 23 so as to secure as widely separated contact as possible between the edges of the parts being operated upon, and the alining means. The plates 12 may be centrally cut away as shown at 25 and the bar 24 arranged longitudinally thereof within the cut away spaces 25. The bars 23 and 24 are preferably connected together as by means of plates or brackets 26 which in turn are secured to a suitable rigid supporting member such as the massive longitudinally extending bar 28. In some instances, it is desirable to provide for turning these alining members, through an angle, as for example, when knife blades are to be so shaped that after being placed in a knife the blade will be held at a predetermined angle, and in order to hold the knife blade or other part in the fixture at the proper angle so that it may be shaped or finished in any desired manner, I may pivot the alining means in the fixture so they will be swung with relation to the fixed parts thereof. This result may be secured by providing a pivoting member such as the shaft 29 extending through suitable openings in the brackets 26 and received in suitable, preferably half round notches 30, in the upper edges of the plates 12. Any suitable means for maintaining the pivoted alining structure so made up in preferred angular position may be resorted to, and in the form shown, there is illustrated a plate 31 pivoted eccentrically on the longitudinal member 3 of the fixture 1 as by a screw 32, and having a plurality of flat edge portions 33, 33, spaced about its periphery and at such distances from the center thereof as to support the bar 28 and alining device connected therewith in any desired angular position. Such plate may contact directly with the bar 28 or may bear against a member such as the angle piece 34 attached thereto. Instead of the plate 31 shown, any other equivalent adjusting means may be made use of.

Means for supporting the parts to be operated upon in position so that their upper ends or faces will be substantially in line, are also provided. With the device shown, and when operating upon knife blades, which have a notch formed between the tang and the cutting portion of the blade, it is convenient to support the said blades in such position by means applied thereto at the notch at the inner end of the tang, and I have shown a straight edged plate 35 which rests upon the forward top surfaces of the plates 12, and having a flat upper face 36 and a sharp edge 37 formed by cutting away the lower face at an angle and which is designed to enter the notches 38 in the blades and to support the blades in position so that the notches therein will be in alinement and when the ends thereof are milled, cut, or ground off on a straight line, the tangs of the blades will be of uniform length.

The operation of an apparatus constructed in accordance with my invention will be readily understood from the foregoing.

The parts to be operated upon are placed edgewise in stacks between the plates 12 and are alined and located at the proper angle as by means of the bars 23 and 24, and are supported at the proper height by suitable supporting means such in the case of the knife blades as the straight edge 35 entering the notches therein, and when so supported and positioned, the screw 9 is rotated so as to apply pressure toward the abutment 8, and the screw 9, abutment 8 and spring plates 12, acting in combination serve to hold the parts firmly in place during any operations to which they may be subjected, the rigidity of the plates 12 when the parts have been clamped in place, preventing any disalinement thereof when attacked by any shaping, finishing or other tool or implement.

It will be understood, of course, that no reliance is placed upon the preliminary alining or supporting means such as the bar 23 or straight edge 35 for holding the parts during operation, but that they are held only by the clamping means comprising the abutment 8, screw or other pressure applying means 9, and plates 12, and that as the plates 12 do not extend to the outer edge of the parts being operated upon, they do not interfere in any manner with milling, grinding, finishing or other operations.

It is apparent that in practice it will be impossible to have the thickness of one of the parts to be operated upon an aliquot part of the normal distance between adjacent plates 12, and when the parts are put in the fixture, in some instances, there may be more or less blades or other parts between two particular adjacent plates, than in the space between others, as for instance, it might happen that between two adjacent plates there will be 13 parts, as knife blades, inserted, whereas, between two others there may be but 12 such parts inserted. It is to take care of such irregularities and to make provision for the movement of the plates 12 which necessarily accompanies the screwing up of the screw 9, that the two parallel regions of reduced thickness in the plates 12 have been provided. The effect of this arrangement is shown in Fig. 5, one of the plates 12 being shown pushed out of normal position, by reason of there being a greater number of blades in the space on one side of it than on the other, and bent at the lower region of reduced thickness produced by the groove 16, and also bent reversely at the upper region of reduced thickness produced by the groove 15 so that the portion of the plate 12 therebeyond still remains parallel to the original position of the plate, and to the other plates, and in this manner the individual plates are free to give along the line of pressure to a sufficient extent and to enable a secure holding of the parts to be operated upon all in identical position, and nevertheless to remain parallel to their normal position at the neighborhood where the clamping takes place. As the grooves 15 are formed, as shown, below the upper extremity of the cutaway parts 25 of the plates 12, that portion of the parts, such as the knife blades 18, which extends beyond the region where the clamping action is effected, can enter the openings 25 in the plates 12 if the latter are bent aside, as is shown clearly in Fig. 5.

The fixture 1 with the parts to be operated upon held in place in the manner described, is supported in any desired manner as by being secured to the bed of a grinding, milling or other machine, and so supported, is caused to be moved relatively to the milling machine cutter, grinding wheel, or other tool, and such relative movement may be caused by moving the fixture and the parts held thereby with relation to the tool, or by moving the tool with respect to the fixture and the parts held thereby, as will be understood, and in this manner as many parts as can be placed in the apparatus may be shaped, finished or subjected to other operations accurately, at the same time, and in a uniform manner.

I claim as my invention:

1. In a device of the class described, the combination of an abutment, pressure applying means opposite said abutment, and means interposed between said abutment and pressure applying means for alining parts to be held in place therebetween with their edges projecting, substantially as and for the purposes set forth.

2. In a device of the class described, the combination of an abutment, pressure applying means and a plurality of fixed members spaced apart and interposed between said abutment and pressure applying means, substantially as and for the purposes set forth.

3. In a device of the class described, the combination of an abutment, pressure applying means and a plurality of spring members spaced apart and interposed between said abutment and pressure applying means, substantially as and for the purposes set forth.

4. In a device of the class described, the combination of a frame, an abutment at one end thereof, means at the opposite end of said frame for applying pressure toward said abutment, and a plurality of fixed members spaced apart and interposed between said abutment and pressure applying means, substantially as and for the purposes set forth.

5. In a device of the class described, the combination of a frame, an abutment at one end thereof, means at the opposite end of said frame for applying pressure toward said abutment, and a plurality of spring members spaced apart and interposed between said abutment and pressure applying means, substantially as and for the purposes set forth.

6. In a device of the class described, the combination of a frame, an abutment thereon, a screw on said frame for applying pressure toward said abutment, and a plurality of spring members spaced apart and interposed between said abutment and screw, substantially as and for the purposes set forth.

7. In a device of the class described, the combination of a frame, an abutment on said frame, pressure applying means on said frame opposite said abutment, and a plurality of spring members free to spring along the line of pressure but held rigidly against movement in other directions, and spaced apart and interposed between said abutment and pressure applying means, substantially as and for the purposes set forth.

8. In a device of the class described, the combination of a frame, an abutment on said frame, means opposite said abutment for applying pressure toward said abutment, and a plurality of transversely arranged spring members secured to said frame so as to be held rigidly against movement in their planes and spaced apart and interposed between said abutment and pressure applying means, substantially as and for the purposes set forth.

9. In a device of the class described, the combination of a frame, an abutment on said frame, means opposite said abutment for applying pressure toward said abutment, and a plurality of spring members secured at or near one margin thereof to said frame and regularly spaced and interposed between said abutment and pressure applying means, substantially as and for the purposes set forth.

10. In a device of the class described, the combination of a frame, an abutment on said frame, a screw in said frame opposite said abutment, and a plurality of spring members capable of springing toward and away from said abutment and screw but rigidly held against movement in other directions, substantially as and for the purposes set forth.

11. In a device of the class described, the combination of a frame, an abutment on said frame, pressure applying means opposite said abutment, and a plurality of members interposed between said abutment and pressure applying means and capable of movement along the line joining said abutment and pressure applying means but substantially incapable of movement in other directions, substantially as and for the purposes set forth.

12. In a device of the class described, the combination of a frame, an abutment on said frame, pressure applying means opposite said abutment and a plurality of spring members interposed between said abutment and pressure applying means and capable of movement along the line joining said abutment and pressure applying means but substantially incapable of movement in other directions, substantially as and for the purposes set forth.

13. In a device of the class described, the combination of a frame, an abutment thereon, pressure applying means on said frame opposite said abutment, and a plurality of spring members spaced apart and interposed between said abutment and pressure applying means and each of said spring members being reduced in thickness along a line extending transversely thereof in order to give freedom of bending toward and away from the abutment and pressure applying means, substantially as and for the purposes set forth.

14. In a device of the class described, the combination of a frame, an abutment thereon, pressure applying means on said frame opposite said abutment, and a plurality of spring members secured to said frame at one of their margins, and spaced apart and interposed between said abutment and pressure applying means and each of said spring members being reduced in thickness along a line extending transversely thereof in order to give freedom of bending toward and away from the abutment and pressure applying means, substantially as and for the purposes set forth.

15. In a device of the class described, the combination of a frame, an abutment thereon, pressure applying means on said frame opposite said abutment, and a plurality of spring members supported on said frame and spaced apart and interposed between said abutment and pressure applying means, each of said spring members being reduced in thickness in a plurality of regions extending transversely thereof, substantially as and for the purposes set forth.

16. In a device of the class described, the combination of a frame, an abutment thereon, pressure applying means on said frame opposite said abutment, and a plurality of spring members secured to said frame at one of their margins and spaced apart and interposed between said abutment and pressure applying means, each of said spring members being reduced in thickness in a plurality of regions extending transversely thereof, substantially as and for the purposes set forth.

17. In a device of the class described, the combination of a frame, an abutment on said frame, pressure applying means on said frame opposite said abutment, a plurality of spring members between said abutment and pressure applying means and secured to said frame below said abutment and pressure applying means, substantially as and for the purposes set forth.

18. In a device of the class described, the combination of a frame, an abutment on said frame, pressure applying means on said frame opposite said abutment, and a plurality of spring members spaced apart and interposed between said abutment and pressure applying means and secured to said frame at or near one edge thereof and at a distance away from said abutment and pressure applying means, said spring members being reduced in thickness between their edges for imparting increased springiness thereto, substantially as and for the purposes set forth.

19. In a device of the class described, the combination of a frame, an abutment on said frame above said base, pressure applying means opposite said abutment on said frame and a plurality of members extending transversely of said frame, and spring members secured to said transverse members and interposed between said abutment and pressure applying means, substantially as and for the purposes set forth.

20. In a device of the class described, the combination of a frame, an abutment on said frame, pressure applying means opposite said abutment, a plurality of members extending across said frame, and spring members interposed between said abutment and pressure applying means and rigidly secured at the lower margins to said cross members, and having their upper parts substantially in alinement with said abutment and pressure applying means, and capable of spring movement in a line toward and away therefrom, substantially as and for the purposes set forth.

21. In a device of the class described, the combination of a frame, an abutment and pressure applying means upon said frame, and spring members spaced apart and interposed between said abutment and pressure applying means, and secured to said frame and each of said spring members thereof being provided with portions reduced in thickness, substantially parallel to the lower edge thereof, substantially as and for the purposes set forth.

22. In a device of the class described, a clamp for holding a series of objects therein with an edge projecting, members movable longitudinally of the clamp for insertion at variable points between the objects, and means for holding the members against movement in a direction transverse to the movement of the clamping means, substantially as and for the purposes set forth.

23. In a device of the class described, clamping elements for holding a series of objects, and spring members with a limited movement in the direction of the clamping action and without movement transversely thereof, said members being adapted to be interposed at various places between the objects, substantially as and for the purposes set forth.

24. In a device of the class described, a pair of clamping members for clamping a series of objects, and a plurality of deformable means permanently interposed between said clamping members and adapted to project between objects held between said clamping means, substantially as and for the purposes set forth.

25. In a device of the class described, a pair of clamping members for clamping a series of objects therebetween, and a plurality of yielding members adapted to extend between objects so clamped, said yielding members being continuous within the region directly affected by the clamping action and having cut away parts adjacent thereto, substantially as and for the purposes set forth.

26. In a device of the class described, the combination of a clamp comprising clamping jaws and a plurality of fixed members adapted to be interposed between objects placed between such jaws and to maintain parts so placed in alinement, substantially as and for the purposes set forth.

27. In a device of the class described, the combination of a clamp comprising clamping jaws, and a plurality of spring members free to give along the line of clamping but held rigidly against movement in other directions and adapted to be interposed between objects placed between such jaws and to maintain parts so placed in alinement, substantially as and for the purposes set forth.

28. In a device of the class described, the combination of a support, clamping elements thereon, a plurality of yielding members fixedly attached to the support and adapted to project between objects held between the clamping elements, substantially as and for the purposes set forth.

29. In a device of the class described, the combination of a clamp comprising clamping jaws, and a plurality of yielding members adapted to project between objects held between the clamping jaws leaving an edge of said objects exposed, substantially as and for the purposes set forth.

30. In a device of the class described, the combination of a plurality of thin spring metal sheets spaced apart and in alinement, means for pressing said plates and parts held therebetween together, and alining means pivoted in said plates, substantially as and for the purposes set forth.

31. In a device of the class described, the combination of a frame, an abutment and opposite pressure applying means on said frame, a plurality of spaced spring members interposed between and in line with said abutment and pressure applying means, and a pivoted frame upon said plates and provided with a plurality of straight edges for alining parts held between said abutment and pressure applying means, substantially as and for the purposes set forth.

32. In a device of the class described, the combination of a frame, an abutment and pressure applying means opposite one another on said frame, a plurality of regularly spaced alined spring members between said abutment and pressure applying means, means for applying pressure thereto and to parts held therebetween, and pivoted means supported on said spring members for alining said parts and locating the angle at which the same shall be held, substantially as and for the purposes set forth.

33. In a device of the class described, the combination of a frame, an abutment and pressure applying means opposite one another on said frame, a plurality of spring members between said abutment and pressure applying means, means for applying pressure thereto and to parts held therebetween, and means for supporting said parts between said spring members and pressure applying means so that the upper ends thereof will be substantially in alinement, substantially as and for the purposes set forth.

34. In a device of the class described, the combination of a frame, an abutment and pressure applying means opposite one another on said frame, a plurality of spring members between said abutment and pressure applying means, means for applying pressure thereto and to parts held therebetween, means for alining parts so held, and means for supporting said parts with the upper ends thereof substantially in alinement.

In witness whereof I have hereunto signed my name in the presence of two subscribing witnesses, this 26th day of May, 1913.

WILLIAM A. YERZLEY.

Witnesses:
  M. A. JOHNSON,
  L. M. FUNKE.

---

Copies of this patent may be obtained for five cents each, by addressing the "Commissioner of Patents, Washington, D. C."